United States Patent
Hong

(10) Patent No.: US 10,771,748 B2
(45) Date of Patent: Sep. 8, 2020

(54) SYSTEM AND METHOD FOR INTERACTIVE AERIAL IMAGING

(71) Applicant: METROPOLITAN LIFE INSURANCE CO., New York, NY (US)

(72) Inventor: Richard Hong, Brooklyn, NY (US)

(73) Assignee: METROPOLITAN LIFE INSURANCE CO., New York, NY (US)

(*) Notice: Subject to any disclaimer, the term of this patent is extended or adjusted under 35 U.S.C. 154(b) by 307 days.

(21) Appl. No.: 14/092,740

(22) Filed: Nov. 27, 2013

(65) Prior Publication Data

US 2014/0320650 A1    Oct. 30, 2014

Related U.S. Application Data

(60) Provisional application No. 61/730,306, filed on Nov. 27, 2012.

(51) Int. Cl.
  *G01C 11/34* (2006.01)
  *H04N 7/18* (2006.01)
  *H04N 5/232* (2006.01)

(52) U.S. Cl.
  CPC ......... *H04N 7/185* (2013.01); *H04N 5/23238* (2013.01)

(58) Field of Classification Search
  USPC .................................................. 348/144, 36
  See application file for complete search history.

(56) References Cited

U.S. PATENT DOCUMENTS

| | | | | |
|---|---|---|---|---|
| 6,580,450 B1* | 6/2003 | Kersting | ............ | B64D 45/0015 348/144 |
| 8,011,615 B2* | 9/2011 | Silansky | ................... | B64B 1/02 244/30 |
| 2004/0004661 A1* | 1/2004 | Muirhead | ............ | G08G 5/0013 348/144 |
| 2005/0271300 A1* | 12/2005 | Pina | ..................... | G06K 9/4647 382/294 |
| 2007/0210937 A1* | 9/2007 | Smith | ..................... | G06Q 30/02 340/995.1 |
| 2009/0152391 A1* | 6/2009 | McWhirk | ................. | B64B 1/02 244/30 |
| 2012/0050524 A1* | 3/2012 | Rinner | ..................... | G06T 3/40 348/117 |
| 2013/0021475 A1* | 1/2013 | Canant | ..................... | H04N 5/33 348/144 |
| 2013/0050487 A1* | 2/2013 | Omer | ..................... | B64D 47/08 348/144 |
| 2013/0191725 A1* | 7/2013 | Meadow | ................. | G06T 17/05 715/234 |

* cited by examiner

*Primary Examiner* — Chikaodili E Anyikire
(74) *Attorney, Agent, or Firm* — Adam P. Daniels, Esq.; Polsinelli PC

(57) ABSTRACT

A computer-implemented method and system is disclosed for capturing and distributing aerial images and/or videos. Images and/or videos are captured from aircraft and transmitted to a ground station. Users are able to view captured images on a real-time or near real-time basis through a user platform on mobile devices and web browsers. The location of the user may also be determined and used to interpolate the user's location with the captured images.

15 Claims, 1 Drawing Sheet

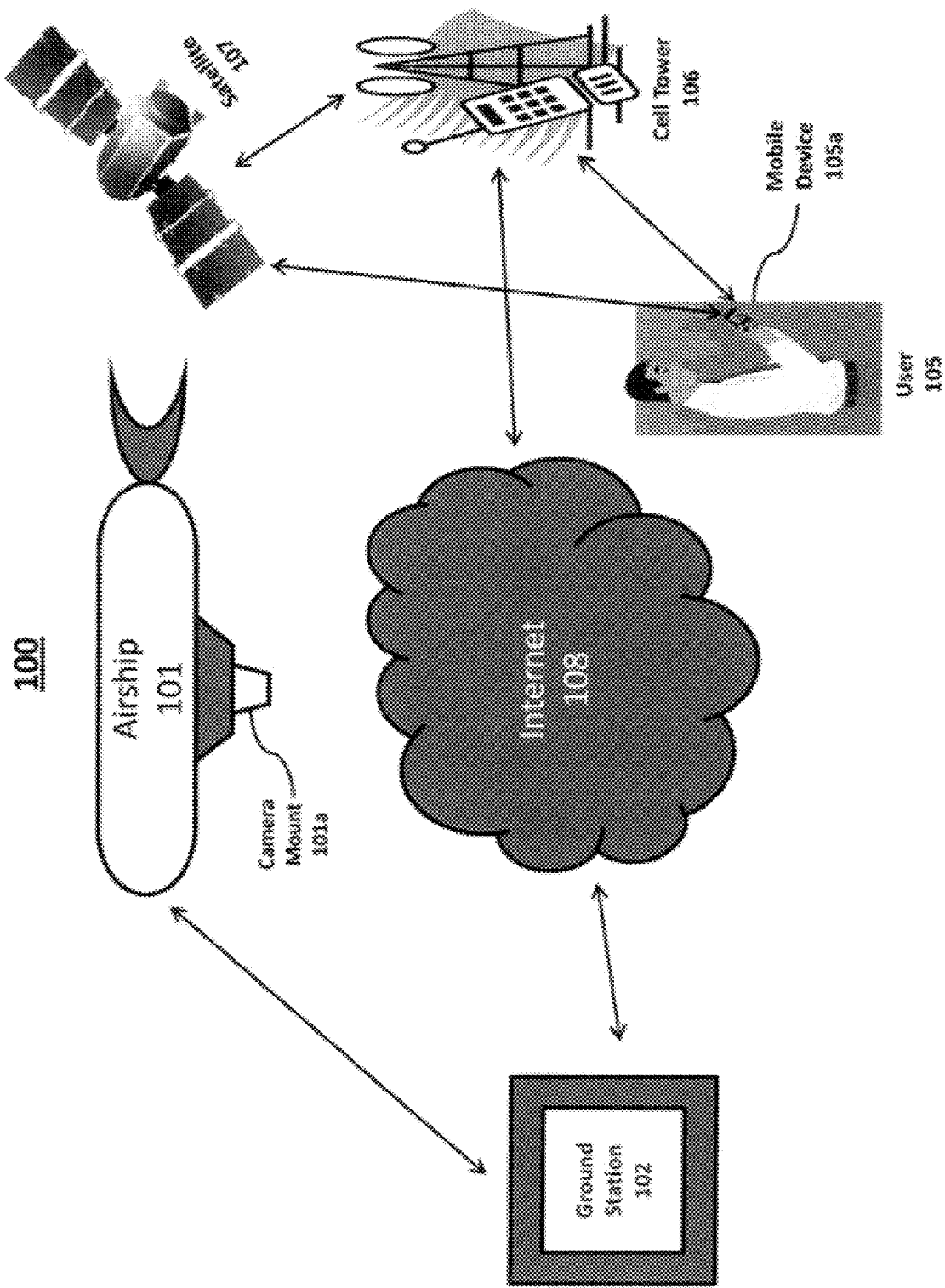

SYSTEM AND METHOD FOR INTERACTIVE AERIAL IMAGING

CROSS REFERENCE TO RELATED APPLICATION

The present application is a Non-Provisional application of U.S. Provisional Application Ser. No. 61/730,306, filed on Nov. 27, 2012. The contents of that application is incorporated herein by reference.

BACKGROUND

Flying airships have been used as aerial billboards, brand ambassadors, and to provide aerial video coverage for broadcast television. The present invention is an aerial content generation platform, intended for use on airships at events, such as the PGA tour or other sporting events. This innovative system offers an immersive and interactive real-time or near real-time streaming video experience for users at home.

Aerial photography and videography offer a unique and interesting perspective of the world that many would enjoy. Unfortunately, capturing this footage typically requires aircraft (e.g. fixed wing aircraft, rotary-wing, airships, etc.) with specialized camera equipment. These activities thus have been historically limited by cost barriers. As such, aerial footage has been limited to content intended for a wider, shared audience. There has not been a system for easily capturing personalized aerial images or video.

BRIEF DESCRIPTION OF THE DRAWINGS

FIG. 1 illustrates an example system according to one aspect of the invention.

DETAILED DESCRIPTION

The present invention comprises a method implemented on a program controlled data processor and a system for generating, processing and transmitting aerial images and/or videos. The following description is meant to be illustrative and not limiting.

The following is a broad description of one embodiment. A camera system platform is mounted on an aircraft or other high-elevation vantage point; and supports a camera system that includes at least one camera capable of capturing image and/or video data and storing the captured data in memory. The camera system is further capable of being directed towards an area of interest. The camera system platform further includes a communications package capable of wireless communication with a ground station located on the ground. The communications package is configured to at least one of: wirelessly transmit captured data stored in memory and receiving control data from the ground station. The control data provides commands to the camera system and/or camera system platform. The ground station communicates via a network connection or a hardware connection with a data server to send captured data and/or receive control data. The data server stores captured data in memory and/or processes the captured data. A web server does at least one of: communicates with the data server to deliver content to an end user through a network connection, transmits a user interface through a network connection to a user platform, receives control data entered through a user platform, and receives location data from a user through the user platform.

In a preferred embodiment, the aircraft provides a secure mount to the camera system platform and is capable of sustained flight. In a preferred embodiment, the aircraft is an airship, which provides many suitable mounting options and are typically capable of prolonged sustained flight with a relatively smooth ride.

In one embodiment, the camera system platform will be a mountable, self-contained rig that is designed to be mountable onboard an aircraft. The camera system platform may be configured to route power from the aircraft. Alternatively, the camera system platform includes an independent electric power source, such as one or more batteries, fuel cells, solar cells or the like. In a preferred embodiment, the camera system platform includes at least one computer processor programmed to at least one of: transmit digital communications, receive digital communications, store data to memory, process captured data, process control data, and process geolocation data. The camera system platform may also include a router to manage data network traffic.

The camera system platform may include a navigational package. The navigational package is configured to determine the location of the camera system platform. This may be accomplished by detecting and interpolating signals from one or more Global Navigation Satellite Systems (GNSS) (e.g., Global Positioning System (GPS)). Alternative and additional systems may be utilized for determining location. Assisted GPS (aGPS) supplements standard GPS methods which can have slow or inaccurate performance based on atmospheric conditions, multipath propagation created by signals bouncing across buildings, and other interference factors. Mobile Station Assisted mode allows the device to receive acquisition assistance and other information regarding visible satellites in the region. Mobile Station Based mode allows the device to receive reference location, reference time, and other optional data to calculate position. WPS provides positioning based on the relative strength of wireless systems within range of a mobile device. This requires the device to be within range of multiple wireless hotspots, and for the WPS system to have maps of those hotspots. This system can be combined with GPS and cell site triangulation. This mechanism was primarily developed by Skyhook Wireless. Cell-site triangulation utilizes a similar positioning mechanism as WPS, but instead utilizes the signal strength of three or more cellular towers. Using three reference points, the system can compute the approximate location of the device. Hybrid systems combine the techniques above with regular GPS in order to improve accuracy and reduce the initial time to seek. Alternatively, the navigational package may receive location data from the aircraft's onboard systems. Location data is derived using any one or more of the above methods and is stored to memory. Additionally, location data may be made available for transmitting to the ground station.

The camera system platform may include a sensor package that provides additional location and orientation data. The sensor package may include any one of: accelerometer, compass, sun sensors, gyroscopes, magnetometers, barometers, thermometers and the like. Data captured by the sensor package is stored into memory and is available for transmitting to the ground station.

The camera system is comprised of at least one digital camera capable of capturing still images and/or video. In a preferred embodiment, separate cameras are used for capturing still images and video. In another embodiment, multiple cameras are utilized concurrently to allow for the capture of image and/or video at a much wider combined field of view. In one configuration, four cameras mounted at 90 degree angles from each other may be used to capture image and/or video with a combined field of view of 360 degrees.

The camera system platform will have at least one means for securely mounting the camera system, depending on the configuration of the camera system, and the needs and goals of the system. In a preferred embodiment, a simple, fixed mount is provided. In another embodiment, a motorized gimbal-type mount is utilized that allows for pan and tilt movement of the camera system. The camera system platform may further include a means for isolating vibrations from the camera system to improve the quality of captured data. A protective cover that encompasses at least the camera system provides protection from the environment. In one embodiment, a clear, durable plastic dome is installed in an easily removable fashion in order to provide protection for the camera system while allowing for image and/or video to be captured. A sufficient air gap should be left around the dome to prevent fogging as the aircraft descends.

The communications package is designed to allow for a reliable communication link between the camera system platform and the ground station. The configuration of the communications package will depend on the needs of the particular implementation of the system with range, bandwidth, reliability, cost and environmental factors being contributing considerations. In one embodiment, the communications package operates on a Wifi system and consists of a router, wireless signal boosters, and directional antennas. Connected to the antennas will be a hi-throughput router. This will connect to the antennas via the signal boosters. The signal boosters push a stronger signal the router alone can deliver which allows the direction antennas mounted externally to reach maximum throughput from air-to-ground.

The ground station is designed to wirelessly transmit and/or receive data with the communications package. It will have technology corresponding to communications package to ensure compatibility. The ground station also must communicate with the data server. In one embodiment, the ground station may communicate with the data server through one or more data networks. In another embodiment, the ground station is directly connected to the data server. In yet another embodiment, the ground station communicates with the data server through an intermediary, such as a mobile data network.

Captured data may be processed by one or more data processors. In one embodiment, the processing tasks may be performed by one or more of the ground station, data server and/or web server to minimize the processing requirements of the camera system platform. In configurations incorporating more than one camera in the camera system, the images and/or videos captured by each camera may be "stitched" into a combined image and/or video with a wider combined field of view.

The user platform may be accessed on a website and/or a mobile application (e.g., iOS, Android OS, Windows Phone and similar systems). A kiosk computer may be made available at events that allow users at the event to access the user platform. The user platform allows users to communicate data with the web server and/or the data server, including any one of: captured data, sensor data, location data of user and/or camera system platform, and control data. The web server may publish any or all of the data retrieved from the camera system platform to the user platforms, including any one of the location data determined by the navigation system, sensor data, captured image and/or video data (processed or unprocessed). In one embodiment, the web server publishes the location data at a real time or near real time basis to the user platforms, so users can track the aircraft in flight. In another embodiment, the web server publishes a stitched panorama of the captured video to the user platforms to give users a view from the perspective of the aircraft. In yet another embodiment, the user platform allows the user to navigate through the panorama by panning and/or zooming to specific portions.

The user platform may be further configured to allow users to save and/or share some or all of the captured data. The user may share the captured data through social media sites, such as Twitter, YouTube, Facebook, Google+, Tumblr, and Flickr. The user platform could also provide tools to edit the data before the user saves or shares the data.

The user platform may be also be configured to allow for users to submit requests to the web server for printed photographs or video media of some or all of the captured data. For example, kiosk computers are set up at the Super Bowl that allow attendees to access the user platform and view a stitched panoramic aerial image captured by an airship flying over the stadium. Jim is at the Super Bowl and operates the kiosk to view the image. He pan and zooms through the panorama to a particular portion of the capture stadium image that shows where he and his family are seated. Jim likes the composed image and operates the user platform to request a printed version as a souvenir. The kiosk prints a copy for Jim to take with him and show to his family back at their seats.

The system may be further configured to recognize objects appearing in the captured images and/or video to enable additional useful features. This may be accomplished by processing the captured data with edge detection and/or object recognition algorithms. If the location of some objects in the captured data is known, or can be determined, then the location of other objects in the captured data can be interpolated. For example, if the system is to be deployed on an aircraft to capture footage over an event, the location of landmarks spread throughout the event and visible from the aircraft's route can be predetermined. The system can then recognize the selected landmarks from the captured footage and determine the location of other objects in the captured footage based on their relative position to the landmarks. Preferably, at least three landmarks are recognized to interpolate location data. Additional recognized landmarks will increase the accuracy of the interpolated data. The landmark location data may be pre-determined by taking GPS measurements at the landmarks or looked up using known GPS reference data (e.g., Google Maps). In a preferred embodiment, the system is trained to recognized the landmarks using images captured from at least one angle that is similar to the aircraft's planned route.

The system may also use the landmark location data to determine the portion of a capture image and/or video where an object of known location would appear. The user platform may be configured to obtain the user's location data from the user's mobile device and transmit this data to the web server. Mobile devices determine and/or estimate location data using methods similar to those described above. The web server and/or the data server can process the user's location data to determine where in the captured data the user would appear. In one embodiment, the user platform flags the user's location within the captured data presented to the user. The user can then zoom in on his or her location to view himself or herself from the aerial vantage point.

The system may further be configured to monitor social media for status updates that include location data that is within the field of view of the camera system. For example, the web server and/or data server can monitor for Twitter status updates that include geotagged photos taken within the field of view from the aircraft's then-current location. In this embodiment, the system may send an invite to the user to install or access the user platform to access aerial footage of himself or herself.

FIG. 1 illustrates an example system according to one aspect of the invention. System 100 includes airship 101, containing camera mount 101a. Airship 101 floats above an event, such as the PGA tour, and records real-time or near real-time footage of the event, and takes still images of selective locations. The airship 101 is able to communicate with ground station 102. Ground station 102 is connected to the internet 108 or other multi-node network. User 105 is at the same event as airship 101, and has with him mobile device 105a containing the BirdsEye application. Mobile device 105a is operable to communicate with cell tower 106 and/or satellite 107 to obtain location information for mobile device 105a (and thus, for user 105) as well as to obtain access to internet 108. Through the BirdsEye application, user 105 requests a souvenir aerial photograph and the application sends the request along with mobile device 105a's current location to ground station 102, via internet 108. Ground station 102 transmits the request and mobile device 105a location to airship 101. Airship 101 takes an image of the location provided in the request, and transmits the image to ground station 102. Ground station 102 transmits the image (souvenir photograph) to mobile device 105a via internet 108.

Ground station 102 also receives real-time or near real-time video data from airship 101. As discussed above, this video information is provided from multiple cameras, and will be processed to create a real-time or near real-time 360 degree panoramic view from the airship. This video information may be provided to user 105's mobile device 105a and/or to other users/computers not at the event (not shown).

The camera system platform and camera system are designed with the complementary goals of simplicity and low weight as the driving factors. Preferred materials include aluminum and composites (e.g., fiberglass and carbon fiber) as they are low weight and high strength. An exemplary listing of weight for the system's camera and communication equipment is provided in Table 1.

TABLE 1

| Component | Quantity | Weight (lbs) | Total Component Weight |
|---|---|---|---|
| Chassis | 1 | 6.5 | 6.5 |
| Cabling | 1 | 2 | 2 |
| Fiberglass Panels | 4 | 1.2 | 4.8 |
| Remote SSR Block | 1 | 0.4 | 0.4 |
| Power Regulator | 1 | 1 | 1 |
| Valence Battery, 40 Ah | 1 | 15 | 15 |
| Teradek Cube | 4 | 0.5 | 2 |
| D-Link Router | 1 | 0.7 | 0.7 |
| Contour HD Camera | 4 | 0.3 | 1.2 |
| Signal Booster | 3 | 0.4 | 1.2 |
| Canon Powershot | 2 | 1.3 | 2.6 |
| | | Total Weight (lbs) | 37.4 |

The presentation, appended to this description and incorporated herein, provides further details of various optional features and embodiments of the present invention.

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Components of the inventive computer system may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

Additionally, elements and features of the invention described above in any and all embodiments may be grouped into packages for the ease of explanation and understanding. It should be understood that there is no strict limitation that these elements and features be restricted to these groups. Any and all packages may be consolidated into superpackages or further divided into subpackages.

What is claimed:

1. A system for providing aerial images or video, comprising:
   a server operable to present a user platform on a user mobile device to a user, wherein the server configured to receive an image request via the user platform from the user mobile device when the user is at an event location, the image request including a current location of the user mobile device; and
   an image system on an airship flying above the event location, the image system in communication with the server via a ground station, including:
      a plurality of cameras mounted on an exterior of the airship at a predetermined angle from each other, the plurality of cameras utilized concurrently to generate images with a combined field of view;
      a communications package capable of real-time or near real-time transmission with the ground station; and
      a processor coupled to the plurality of cameras and the communications package, the processor configured to:
         receive an instruction from the server to process the image request from the user, the instruction includes data indicating the current location of the user mobile device provided by the user mobile device;
         instruct the plurality of cameras to capture images of the current location of the user mobile device provided in the image request, the captured images including a first image captured by a first camera and a second image captured by a second camera; and
         instruct the communications package to transmit the images to the server which:
            combines the first image captured by the first camera and the second image captured by the second camera into a stitched panoramic image with the combined field of view from an aerial vantage point over the event location,
            processes the data included in the instruction that indicates the current location of the user mobile device,
            identifies a point within the stitched panoramic image that represents the current location of the user mobile device based on the processed data; and
            flags the identified point within the stitched panoramic image for display on the user mobile device so that the user views the current location of the user mobile device from the aerial vantage point.

2. The system of claim 1, further comprising a navigational system operable to determine the location of the image system.

3. The system of claim 1, wherein the user platform is accessed through a mobile application.

4. The system of claim 1, wherein each of the plurality of cameras is configured to capture a different field of view.

5. The system of claim 4, wherein the server includes at least one data processor programmed to combine more than one photo and/or video captured by the image system into a single photo and/or video.

6. The system of claim 1 wherein the user platform sends the user's location data to the server.

7. The system of claim 6 wherein the server includes a data processor programmed to determine the user's location within at least one photo and/or video captured by the image system.

8. A computer-implemented method for providing aerial images or video, comprising:
   receiving, by a processor of an image system on an airship flying above an event location, an instruction from a server on a ground to process an image request from a user mobile device when a user is at the event location, the image request including a current location of the user mobile device provided by the user mobile device, the image system being in communication with the server via a ground station, the image request being obtained by the server via a user platform on the user mobile device;
   instructing, by the processor of the image system on the airship, a plurality of cameras mounted on an exterior of the airship at a predetermined angle from each other to concurrently capture images with a combined field of view of the current location of the user mobile device provided in the image request, the plurality of cameras including a first camera that captures a first image and a second camera that captures a second image; and
   instructing, by the processor of the image system on the airship, a communications package on the airship to transmit the captured images to the server which:
      combines the first images captured by the first camera and the second image captured by the second camera into a stitched panoramic image with the combined field of view from an aerial vantage point over the event location,
      identifies a point within the stitched panoramic image that represents the current location of the user mobile device by processing the image request that includes the current location of the user mobile device; and
      flags the identified point within stitched the panoramic image for display on the user mobile device so that the user views the current location of the user mobile device from the aerial vantage point.

9. The method of claim 8, further comprising determining the location of the image system platform with a navigational system.

10. The method of claim 8, wherein the user platform is accessed through a mobile application.

11. The method of claim 8, wherein each of the plurality of cameras is configured to capture a different field of view.

12. The method of claim 8, wherein the server combines, with at least one operably programmed data processor, more than one photo and/or video captured by the image system into a single photo and/or video.

13. The method of claim 8, wherein the user platform sends a user's location data to the server.

14. The method of claim 8, wherein the server determines, with at least one operably programmed data processor, the user's location within at least one photo and/or video captured by the image system.

15. The system of claim 1, wherein the ground station is configured to receive real-time or near real-time video data from the airship.

\* \* \* \* \*